United States Patent [19]

Kozu et al.

[11] 3,860,964

[45] Jan. 14, 1975

[54] TAPE CARTRIDGE CHANGER

[75] Inventors: Isao Kozu; Hidetoshi Kurihara, both of Osaka-fu, Japan

[73] Assignee: Matsushita Electric Industrial Co., Ltd., Osaka, Japan

[22] Filed: May 15, 1968

[21] Appl. No.: 729,233

[30] Foreign Application Priority Data

May 16, 1967 Japan ............................... 42-31662

[52] U.S. Cl. .................................... 360/92, 360/105

[51] Int. Cl. ......................... G11b 5/00, G11b 23/04

[58] Field of Search ............... 274/4, 11; 179/100.2; 353/15, 19, 120; 214/16.4; 360/92, 105

[56] References Cited

UNITED STATES PATENTS

| | | | |
|---|---|---|---|
| 3,146,666 | 9/1964 | Misuraca | 353/111 |
| 3,353,443 | 11/1967 | Hall | 353/15 |
| 3,359,665 | 12/1967 | Gerry | 274/11 C |
| 3,477,785 | 11/1969 | Gould et al. | 353/111 |
| 3,488,058 | 1/1970 | Staar | 272/4 E |

*Primary Examiner*—Harry N. Haroian

*Attorney, Agent, or Firm*—Wenderoth, Lind and Ponack

[57] ABSTRACT

A tape cartridge changer is provided which comprises in combination a tray for receiving a plurality of cartridges each of which has a magnetic tape therein, a tape deck which includes tape moving means and magnetic heads to record and playback the tape, cartridge exchanging means for successively translating the cartridges from the tray into the tape deck so as to engage the cartridges with the tape deck, and means for intermittently driving the tray to successively convey the cartridges to a position corresponding to an insertion opening of the tape deck in every cycle of said cartridge exchanging means. If desired, operating means may be provided with which an operator can manually exchange the cartridge being played for the next cartridge and can manually stop the exchanging cycle.

17 Claims, 15 Drawing Figures

INVENTORS
ISAO KOZU
HIDETOSHI KURIHARA

BY Wenderoth, Lind & Ponack
ATTORNEYS

PATENTED JAN 14 1975 3,860,964

INVENTORS
ISAO KOZU
HIDETOSHI KURIHARA

BY Wenderoth, Lind & Ponack
ATTORNEYS

INVENTORS
ISAO KOZU
HIDETOSHI KURIHARA

BY Wenderoth, Lind & Ponack
ATTORNEYS

INVENTORS
ISAO KOZU
HIDETOSHI KURIHARA

BY Wenderoth, Lind & Ponack
ATTORNEYS

INVENTORS
ISAO KOZU
HIDETOSHI KURIHARA

BY Wenderoth, Lind & Ponack
ATTORNEYS

INVENTORS
ISAO KOZU
HIDETOSHI KURIHARA

BY Wenderoth, Lind & Ponack
ATTORNEYS

INVENTORS
ISAO KOZU
HIDETOSHI KURIHARA

BY Wenderoth, Lind & Ponack
ATTORNEYS

INVENTORS
ISAO KOZU
HIDETOSHI KURIHARA

BY Wenderoth, Lind & Ponack
ATTORNEYS

INVENTORS
ISAO KOZU
HIDETOSHI KURIHARA

BY Wenderoth, Lind & Ponack
ATTORNEYS

TAPE CARTRIDGE CHANGER

This invention relates to magnetic tape recorders, and more particularly to apparatus for automatically recording and playing back a plurality of tape cartridges.

The general object of the present invention is to provide an improved apparatus capable of automatically and successively engaging a plurality of tape cartridges from a storage tray with a tape deck.

Another object of this invention is to provide an improved apparatus having novel reject means which allows an operator to manually exchange a cartridge in operation for the next cartridge.

Still another object of this invention is to provide a new and improved apparatus which is cabable of successively conveying cartridges in a tray to a position corresponding to an insertion opening of a tape deck and automatically transporting said cartridges to an operative position within said tape deck for engaging said cartridges with the operating components of said tape deck.

A still further object of this invention is to provide an improved apparatus capable of automatically stopping its operation after completion of playing all of the tape cartridges in a tray.

A still further object of this invention is to provide an improved apparatus adapted to allow manual stopping of the playing of a tape cartridge engaged with a tape deck.

A still further object of this invention is to provide an improved apparatus having novel means capable of effecting an operation to fast-forward drive or rewind drive a tape cartridge engaged with a tape deck.

A still further object of this invention is to provide an improved apparatus capable of being manually stopped to allow operation of a tape cartridge engaged with a tape deck after fastforward drive.

Further objects and advantages will become apparent from the following detailed description taken in connection with the accompanying drawings in which.

Figure 1:
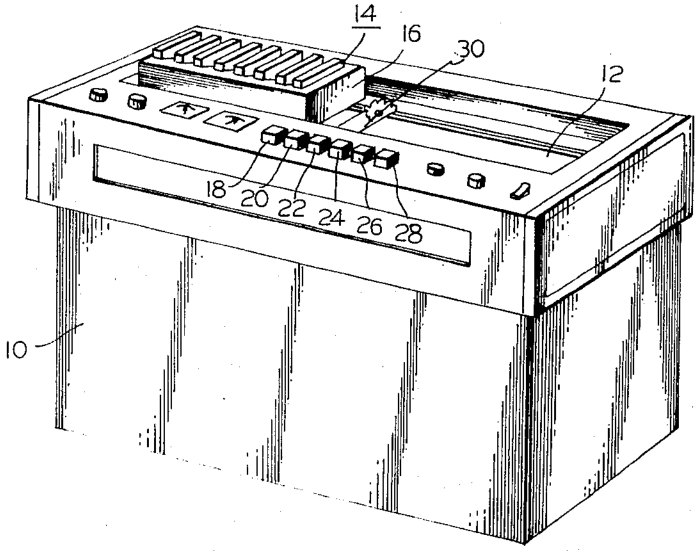
FIG. 1 is a perspective view of a tape cartridge changer embodying the invention.

The tape cartridge changer according to the present invention comprises a tray for receiving a plurality of cartridges each of which has a magnetic tape therein, a tape deck which includes tape moving means and magnetic heads to record and play back said tape, cartridge exchanging means for successively translating the cartridges from the tray into the tape deck so as to engage the cartridges with the tape deck, and means for intermittently driving the tray to successively convey the cartridges to a position corresponding the tray to successively convey the cartridges to a position corresponding to an insertion opening of the tape deck in every cycle of the cartridge exchanging means.

Referring now to the drawings, there will be explained one embodiment of a tape cartridge changer of the present invention.

Figure 15:
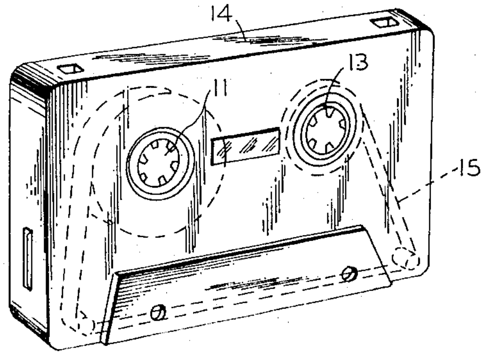
FIG. 15 is a perspective view of a tape cartridge used in this tape cartridge changer.

With reference to FIG. 1, a cabinet 10 has, on an upper portion thereof, a tray guide 12 which allows a tray 16 to move smoothly along said upper portion during operation. Said tray 16 carries a plurality of tape cartridges 14 arranged in a row and parallel to each other. The individual tape cartridge 14 utilized in conjunction with the apparatus of this invention is of a twinreel type, as is best seen in FIG. 15, and comprises two reels 11 and 13, and a magnetic tape 15. The tape 15 is wound on said reels by virtue of the ends of the tape 15 being fixed to the respective reels.

Referring again to FIG. 1, the front surface of the upper portion of the cabinet 10 has operating means comprising a play button 18, a reject button 20, a stop button 22, a fast-forward button 24, a rewind button 26, and a record button 28.

The tray 16 can be manually moved along the tray guide 12 so that a first cartridge (right end cartridge in FIG. 1) may be located at the loading position corresponding to an insertion opening 30. When the play button 18 is depressed, the cartridge 14 falls down into the insertion opening 30 so that cartridge exchanging means brings the cartridge 14 into operative engagement with a tape deck 32 which includes tape moving means and magnetic heads, as will be explained in detail with reference to FIG. 3.

After the playing of the cartridge 14 has been completed, said cartridge exchanging means lifts the cartridge 14 and brings it back to the tray 16. Then the tray 16 is stepped or moved forward a predetermined distance so that the next cartridge is conveyed to the loading position corresponding to the insertion opening 30.

Figure 2:
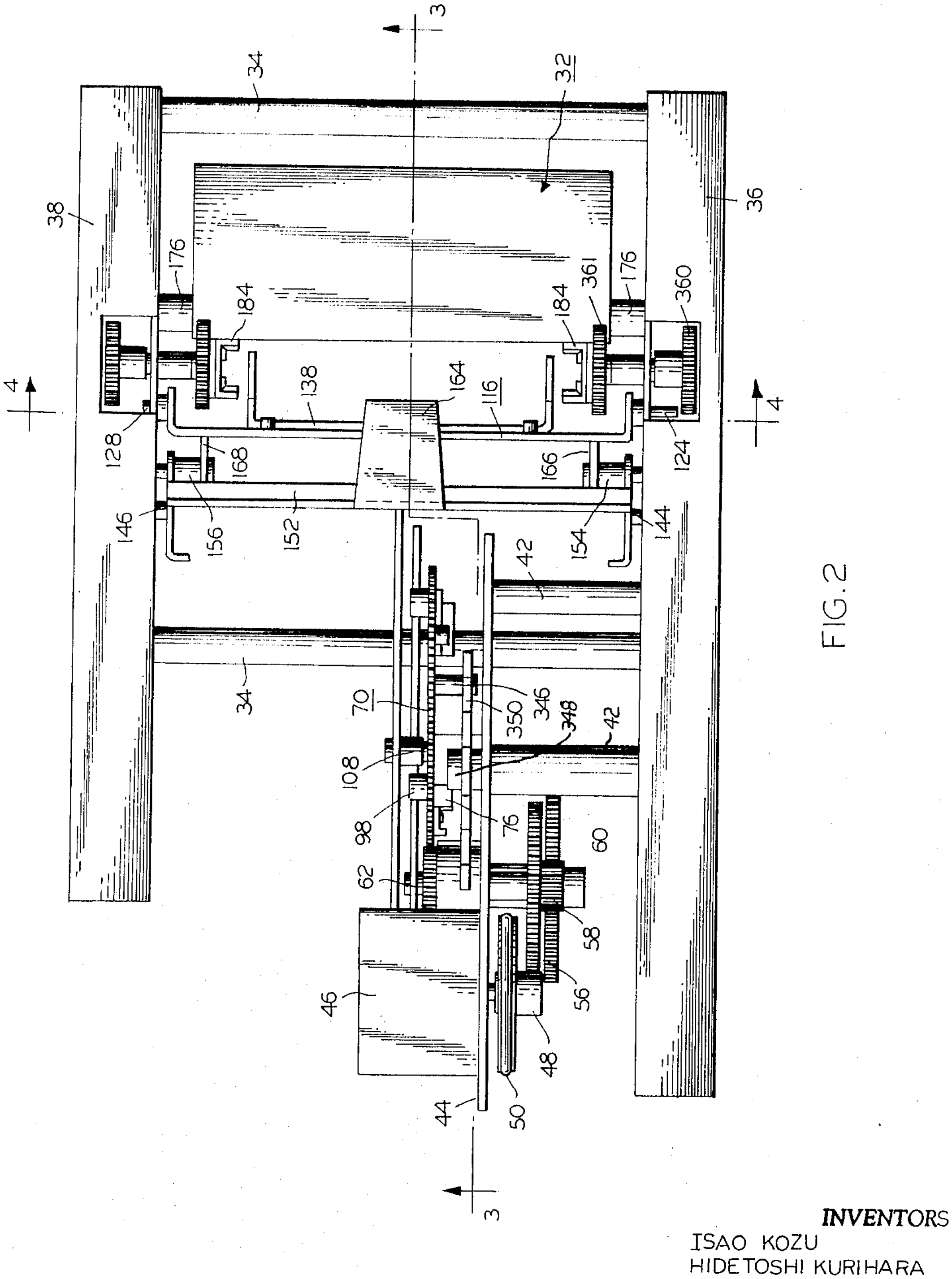
FIG. 2 is a top plan view of the tape cartridge changer of FIG. 1 with the cabinet and upper chassis removed for purpose of clarity.

Now there will be given a more detailed description of the structure of various mentioned above. Thus, referring to FIG. 2 and FIG. 3, the structure of cartridge exchanging means may be explained with the following description:

An upper chassis 40 is secured to upper portions of side chassis 36 and 38, each of which is fixedly spaced by stay rods 34. The tray guide 12 is formed on said upper chassis 40. A second motor 46 for driving cartridge exchanging means is supported on a main chassis 44 which is connected with the side chassis 36 through stay poles 42. The rotational force of the second motor 46 is transmitted to a pinion 62 through a motor pully 48, an endless belt 50, an output pully 52, and a train of gears 54, 56, 58, and 60. Accordingly, the pinion 62 rotates in the direction of arrow 64 in FIG. 3 when electric power is supplied to the second motor 46.

Figure 3:
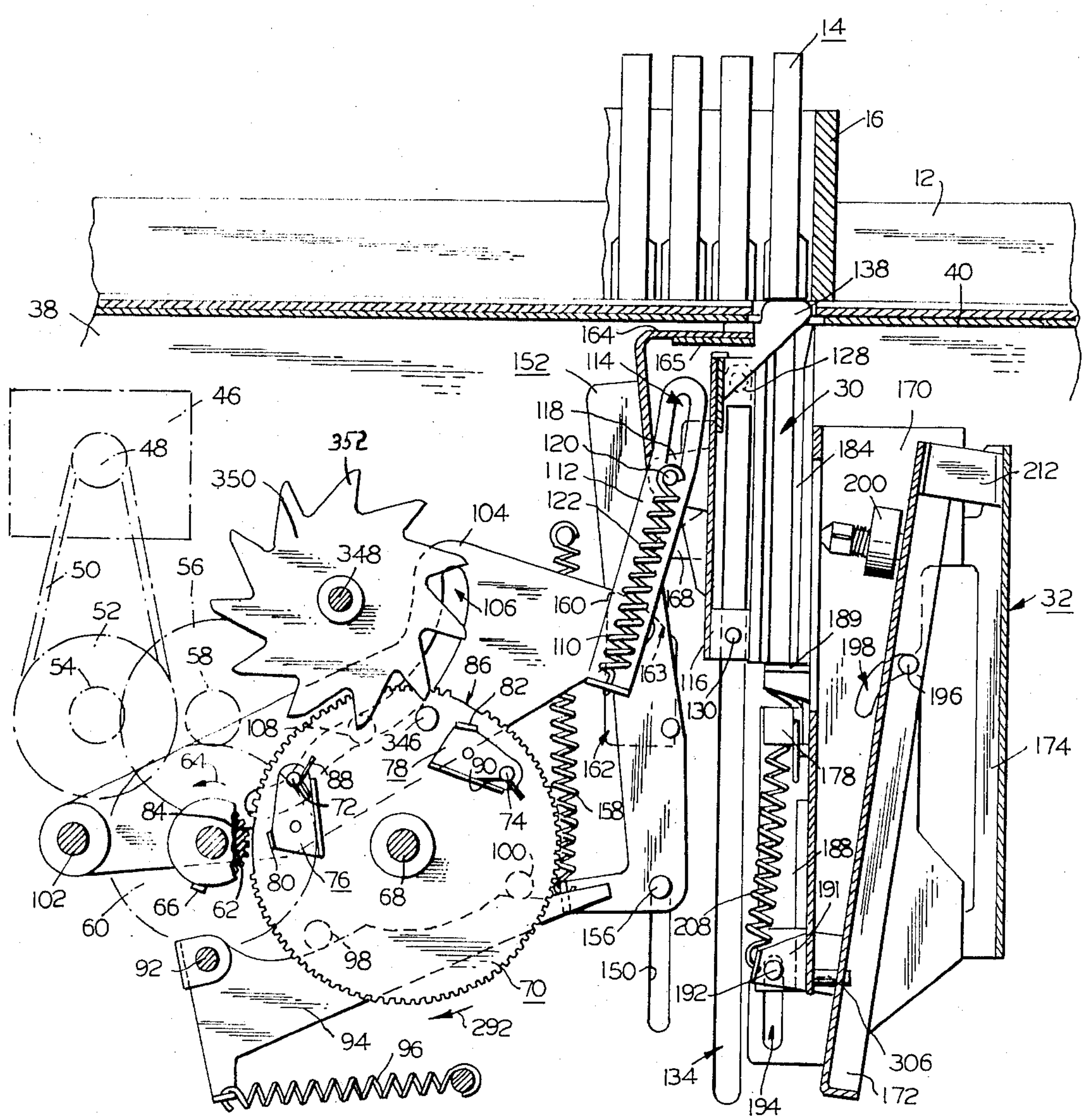
FIG. 3 is a sectional view taken substantially along the line 3—3 of FIG. 2.

The pinion 62 is provided with a claw 66 which can be engaged with bent tabs 80 and 82 of a first clutch lever 76 and a second clutch lever 78, respectively. Said levers 76 and 78 are pivotally mounted on shafts 72 and 74 which are in turn fixed to an auto-gear 70. The auto-gear 70 is rotatably mounted on a shaft 68 secured on the main chassis 44, and has a first mutliated section 84 and a second mutilated section 86 in the toothed periphery thereof. At a first stop position of the autogear 70, as seen in FIG. 3, the first mutilated section 84 is faced to the pinion 62 so that the auto-gear 70 is out of engagement with said pinion 62. The clutch levers 76 and 78 are normally rotated to occupy the maximum counter clockwise position shown in FIG. 3 due to the biasing force of respective torsion springs 88 and 90, so that said levers 76 and 78 do not engage with the claw 66 of the rotating pinion 62.

A regulating lever 94 is pivotally mounted on a shaft 92 which is secured on the main chassis 44, and is pressed against pins 98 and 100 which are fixed to the auto-gear 70 by the biasing force of a spring 96. Consequently, the auto-gear 70 is regulated or positively positioned in its first stop position, as shown in FIG. 3.

A driving pin 108 secured on the auto-gear 70 is inserted in a slot 106 of a cam lever 104 which is pivotally mounted on a shaft 102 secured on the main chassis 44. Said cam lever 104 thus swings up and down in response to the rotation of the auto-gear 70.

One end of the cam lever 104 is connected to one end of a connecting plate 112 by a pin 110. A pin 120 fixed on a lug portion 118 of an elevator 116 is inserted in a slot 114 of the other end of the connecting plate 112, and a spring 122 is disposed between the pin 120 and the end of the connecting plate 112 so as to urge the lower end of the slot 114 against the pin 120, as shown in FIG. 3.

Figure 8:
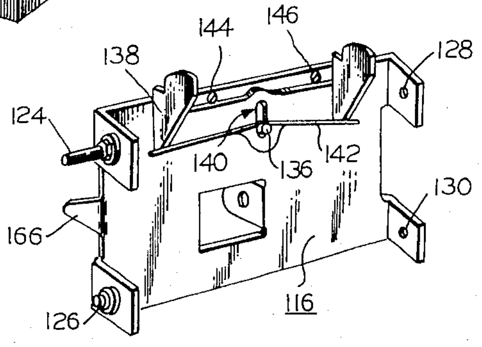
FIG. 8 is a fragmentary perspective view showing parts of the cartridge exchanging means used in this tape cartridge changer.
Figure 9:
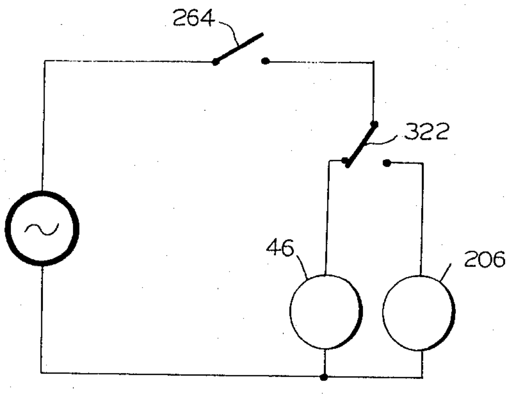
FIG. 9 is a diagrammatic illustration of an electrical circuit for supplying electric power to motors used in this tape cartridge changer.

In accordance with the swing motion of the cam lever 104, the elevator 116 moves up and down along slots 132 (FIG. 5) and 134 (FIG. 3) formed in the side chassis 36 and 38 under the guidance of guide pins 124, 126, 128, and 130, which are secured on the sides of the elevator 116, as is best seen in FIG. 8.

As shown in FIG. 8, a pin 136 secured to the central portion of the elevator 116 is inserted in a slot 140 of a cartridge supporting member 138. The cartridge supporting member 138 is biased upward by a torsion spring 142 and is limited in its movement by a pair of pins 144 and 146 which are secured on the elevator 116.

With reference again to FIG. 2 and FIG. 3, a cartridge depressing device 152 is slidably mounted between side chassis 36 and 38. That is, driven pins 154 and 156 secured to the lower portion of said device 152 are inserted respectively in slots 148 and 150 which are formed on the side chassis 36 and 38. The cartridge depressing device 152 is caused to move upward and to rotate clockwise about the driven pins 154 and 156 under the biasing force of springs 158. This clockwise rotation is limited by a pin 160 secured to the cartridge depressing device 152, which pin 160 is pressed against a slope portion 163 of an aperture 162 formed on the side chassis 38. A rubber plate 165 is adhered to a lower surface of a depressing tab 164 which projects horizontally from the upper portion of the cartridge depressing device 152 so as to engage the top of the cartridge 14, as will be seen later.

The cartridge depressing device 152 is in a condition to move downward, when bent tabs 166 and 168 carried by opposite sides of the elevator 116 (see FIG. 2) push down the driven pins 154 and 156 of said device 152, respectively, in response to the downward movement of said elevator 116. At the same time, the cartridge depressing device 152 swings in a clockwise direction about the driven pins 154 and 156 according to the movement of the pin 160 along the slope portion 163 of the aperture 162.

Now referring to FIG. 3 and FIG. 4, there will be described the structure of the tape deck 32 used in the tape cartridge changer of the present invention.

Thus, the tape deck 32 comprises a main deck 170, a movable deck 172 and a rear deck 174. The main deck 170, having spacers 176 attached to both sides thereof, is thereby fixedly supported between the side chassis 36 and 38. The main deck 170 has a record-playback head 178, an erase head 180, and a pinch roller 182 at the proper position thereon to engage the cartridge 14 when in the operative position. The main deck 170 also has opposed guide members 184 for guiding the cartridge 14 to move smoothly from the tray 16 to the operative position contiguous to said heads 178 and 180 and said roller 182.

Two driven members 188 are slidably mounted on the main deck 170 under the guidance of two guide pins 190; said pins 190 being secured on said members 188 and inserted in slots 186 formed in the main deck 170. The lower ends of the members 188 are connected with the movable deck 172 by pins 192. To explain, said pins 192 are secured to projections 191 that extend from both sides of the movable deck 172 and extend horizontally from both sides of the movable deck 172 and extend horizontally through slots 194 which are formed at lower portions of side walls of the main deck 170. The movable deck 172 has pins 196 secured to the side walls thereof. Said pins 196 are inserted in arcuate slots 198 formed in the side walls of the main deck 170.

Accordingly, the movable deck 172 can be slidably moved along the slots 194 and 198 of the main deck 170 by the movement of the driven members 188.

The movable deck 172 is provided with tape moving means including a supply reel roller 200, a takeup reel roller 202, a capstan 204 and a first motor 206 (see FIG. 4) to supply the same with the necessary rotational power. Appropriate means used in a conventional tape recorder may be used for the purpose of transmitting the rotational power of the motor 206 to the supply reel roller 200, to the takeup reel roller 202 and to the capstan 204. Such means is not illustrated in the drawings and no detailed description is given herein since it is not an important constituent of the tape cartridge changer of the present invention and forms no inventive part thereof.

One end of a spring 208 is connected to the projections 191 of the movable deck 172, and the other end of said spring 208 is anchored at hooks 210 of the main deck 170. Accordingly, the movable deck 172 is biased so as to be urged upwardly and in the clockwise direction about the pins 192 under the guidance of the slots 198. A leg 212 is secured to the movable deck 172 and is normally pressed against the rear deck 174 to limit the clockwise rotation of said movable deck 172.

Figure 5:
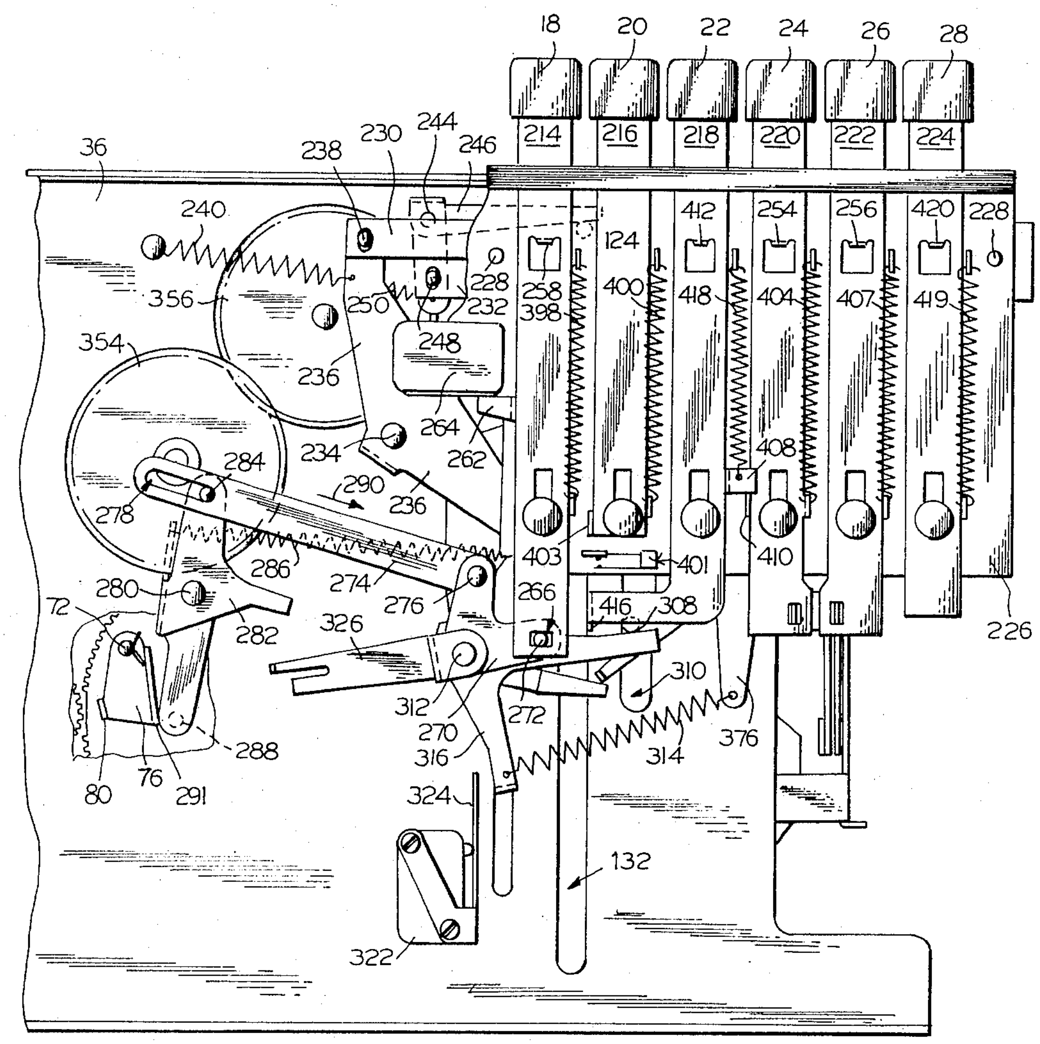
FIG. 5 is a fragmentary elevational view of the tape cartridge changer showing the operating means in detail.
Figure 6:
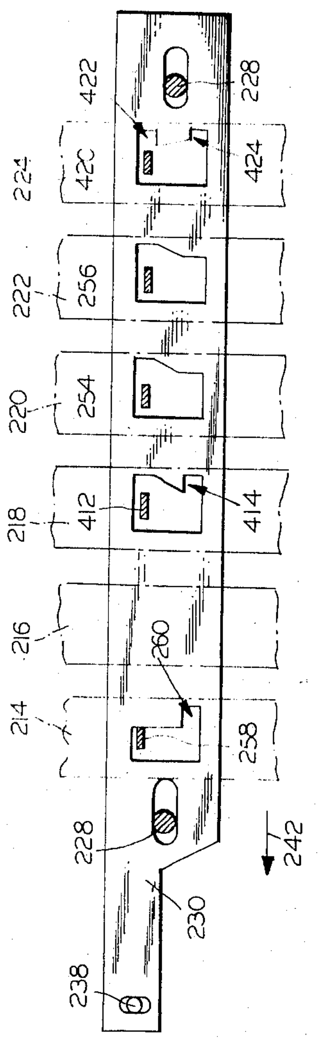
FIG. 6 is another fragmentary elevational view in more detail showing the relationship of the parts of the operating means used in this tape cartridge changer.
Figure 7:
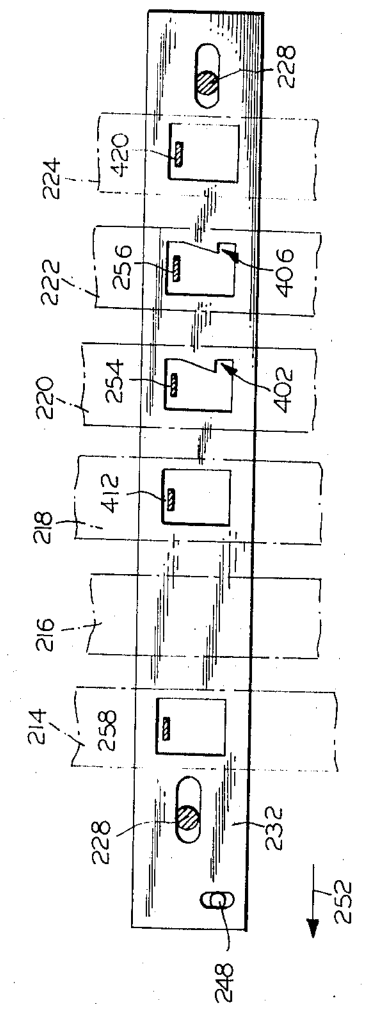
FIG. 7 is an additional fragmentary elevational view also showing in detail the relationship of parts of the operating means used in this tape cartridge changer.

Referring now to FIG. 5, FIG. 6 and FIG. 7, there will be hereafter described the detailed structure of operating means used in this tape cartridge changer.

The play button 18, the reject button 20, the stop button 22, the fast-forward button 24, the rewind button 26 and the record button 28 are affixed to respective upper edges of a play key 214, a reject key 216, a stop key 218, a fast-forward key 220, a rewind key 222 and a record key 224. Said keys are slidably mounted on a supporting plate 226 which is secured to the side chassis 36. The supporting plate 226 is provided with a first latch plate 230, as shown in FIG. 6, and a second latch plate 232, as shown in FIG. 7, at the back surface thereof. Said latch plates 230 and 232 can slide horizontally along guide pin 228 secured on the supporting plate 226. The left hand end of the first latch plate 230 is connected by a pin 238 to a first button releasing lever 236, which in turn pivotally mounted on an intermediate shaft 234 secured on the side chassis 36. The first button releasing lever 236 is caused to rotate counterclockwise under the biasing force of a spring 240, so that the first latch plate 230 is pulled towards the direction of arrow 242 (in FIG. 6).

The left hand end of the second latch plate 232 is connected with a pin 248 on a second button releasing lever 246 which is pivotally mounted on a shaft 244 secured on the side chassis 36.

The second button releasing lever 246 is caused to rotate in the clockwise direction under the biasing force of a spring 250, so that the second latch plate 232 is pulled towards the direction of arrow 252 (FIG. 7).

The elevator 116 normally occupies the raised position when the tape cartridge changer is not in operation. Also, in the inoperative state, the guide pin 124 of the elevator 116 pushes the second button releasing lever 246 upwardly so as to rotate it in the counterclockwise direction, as shown in FIG. 5. Then, the second latch plate 232 occupies the position illustrated in FIG. 7, and if the fast-forward key 220 is depressed, a bent tab 254 will not be latched by the second latch plate 232. Further, if the rewind key 222 is depressed, a bent tab 256 will not be latched by the second latch plate 232.

With reference to FIGS. 3, 5, 6, and 9, there will be hereafter explained the detailed structure and operation of clutch means for causing meshing engagement between the pinion 62 and the auto-gear 70 by means of the depression of the play button 18. Thus, when the play button 18, is depressed, the first latch plate 230 moves in the direction of arrow 242 (in FIG. 6) by the force of the spring 240, and a bent tab 258 of the play key 214 is latched by a cut-out portion 260 of the first latch plate 230. At the same time, a projection 262 of the play key 214 moves away from a normally closed microswitch 264 mounted on the supporting plate 226, so that the circuit through the micro switch 264 is completed and electric power is thus supplied to the second motor 46 for driving the cartridge exchanging means (note FIG. 9). Accordingly, the pinion 62 starts to rotate in the direction of arrow 62, as shown in FIG. 3.

Referring now to FIG. 5, and L shaped lever 270 having a pin 272 affixed at one end thereof, is pivotally mounted on a shaft 312 secured on the side chassis 36. Said pin 272 is inserted in a slot 266 formed at a lower edge of the play key 214. The other end of the L shaped lever 270 is connected to one end of a connecting rod 274 through a pin 276. A clutch actuating device 282 is pivotally mounted on a fixed shaft 280, and is provided with a pin 284 which is inserted in a slot 278 formed at the other end of the connecting rod 274. The clutch actuating device 282 is biased to rotate clockwise by a spring 286, but the rotation of said device 282 is limited by engagement of the pin 284 with the right hand end of the slot 278 of the connecting rod 274 when the tape cartridge changer is in the inoperative state, as shown in FIG. 5. Accordingly, an actuating pin 288 fixed on one end of the clutch actuating device 282 is out of engagement with the first clutch lever 76.

The L shaped lever 270 rotates clockwise and the connecting rod 274 moves in the direction of arrow 290 when the play key 214 is depressed. Consequently, the clutch actuating device 282 swings clockwise through action of the spring 286. Then, the actuating pin 288 is operative to push a bent portion 291 of the first clutch lever 76 to cause the latter to swing in the clockwise direction about the shaft 72.

The claw 66 of the pinion 62, which rotates in the direction of arrow 64 in FIG. 3, kicks the bent tab 80 of the first clutch lever 76 so as to initiate rotation of the autogear 70 in the direction of arrow 292. This causes meshing engagement between the pinion 62 and the peripheral gear teeth of the auto-gear 70. Then, the autogear 70 continues to rotate in the direction of arrow 292 away from its first stop position just described. According to this rotation, the cam lever 104 is driven by the driving pin 108 so as to swing clockwise about the shaft 102. Accordingly, the elevator 116 is moved downwardly through the action of the connecting plate 112 and the first in line cartridge 14, which is seated on cartridge supporting member 138, slides down into the insertion opening 30 by gravity under the guidance of the guide members 184.

When the elevator 116 reaches a predetermined position, the bent tabs 166 and 168 depress the driven pins 154 and 156 of the cartridge depressing device 152 so that said device 152 moves downwardly in response to the movement of said elevator 116 and swings at the proper time in the clockwise direction. Consequently, the rubber plate 165 carried by the depressing tab 164 of said device 152 is positioned just above the cartridge 14 which has now moved well down into the opening 30. When the lower surface of the cartridge 14 is in contact with upper bent portions 189 of the driven members 188, the cartridge 14 stops its downward movement temporarily. But, the elevator 116 continues its downward movement so that the rubber plate 165 of the cartridge depressing device 152 pushes down on the top of the cartridge 14 whereby to cause the forced downward movement of the driven members 188. In response to the downward movement of the driven members 188, the movable deck 172 moves downwardly and at the same time rotates counterclockwise by the guidance of the slots 194 and 198. As a result, the supply reel roller 200, the takeup reel roller 202, and the capstan 204 are engaged with respective apertures 294, 296 and 298 of the cartridge 14, as illustrated by a dotted line 14a in FIG. 4.

Figure 4:
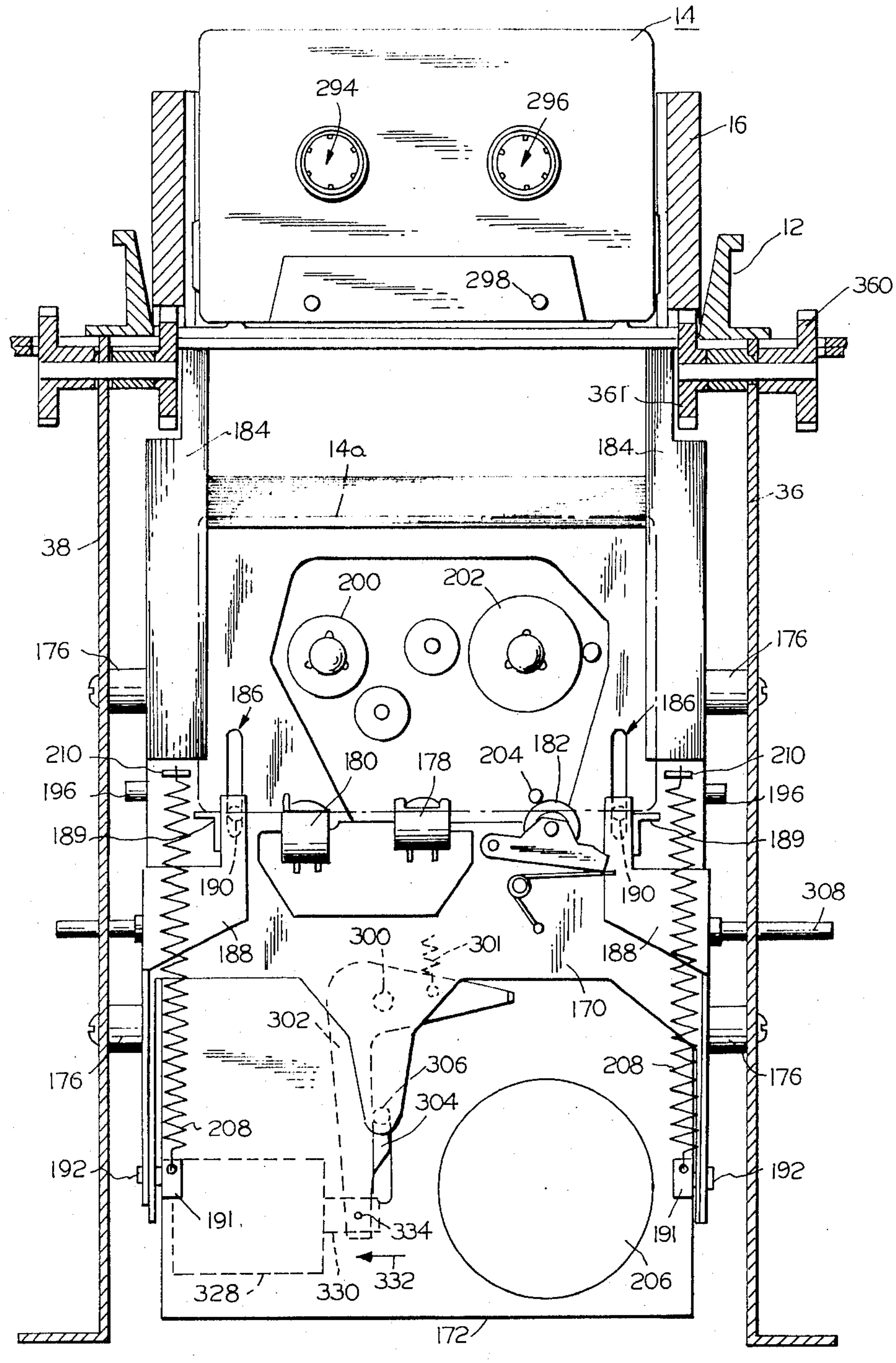
FIG. 4 is a sectional view of the tape cartridge changer in its playing state taken substantially along the line 4—4 of FIG. 2.

When the elevator 116 reaches the lowest position thereof, a lock pin 306 fixedly secured on the main deck 170 locks on a stepped portion 304 of a latch member 302; the latter being pivotally mounted on a shaft 300 secured on the movable deck 172 and which is biased counterclockwise by a spring 301, as shown in FIG. 4. Consequently, the movable deck 172 is locked at the lowest position thereof.

Figure 10:
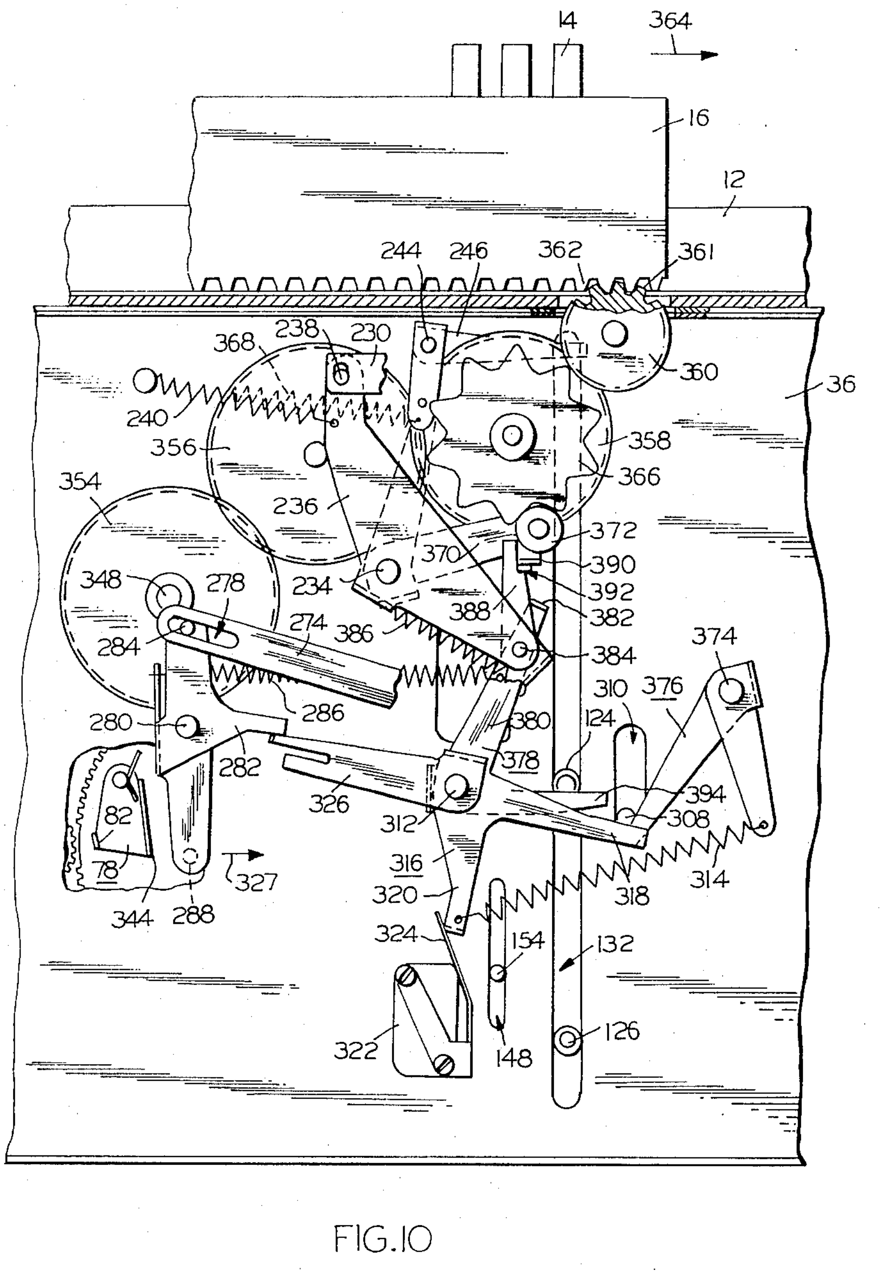
FIG. 10 is a fragmentary elevational view, similar to FIG. 5, but with certain parts of operating means removed for clarity, showing the tape cartridge changer in its playing state.

A control pin 308 is fixedly secured to one of the driven members 188 and extends horizontally through a slot 310 of the side chassis 36, as shown in FIG. 4 and FIG. 10. Said control pin 308 pushes and rotates clockwise a first arm 318 of a switching lever 316 which is pivotally mounted on the shaft 312 secured on the side chassis 36 and which is biased to rotate counterclockwise by a spring 314; this action occurring when the movable deck 172 occupies the lowest position thereof.

At this time, a second arm 320 of the switching lever 316 pushes an actuator 324 of a microswitch 322 in such a way that said switch 322 (note FIGS. 9 and 10) switches the electric power from the second motor 46 to the first motor 206. Thus, the tape encased in the cartridge 14, engaged with the tape deck 32, is reproduced by movement across the head 178 in response to the rotation of the first motor 206.

On the other hand, with reference to FIG. 10, a third arm 326 of the switching lever 316 pushes and rotates the clutch actuating device 282 so as to move the actuating pin 288 in the direction of arrow 327.

Figure 11:
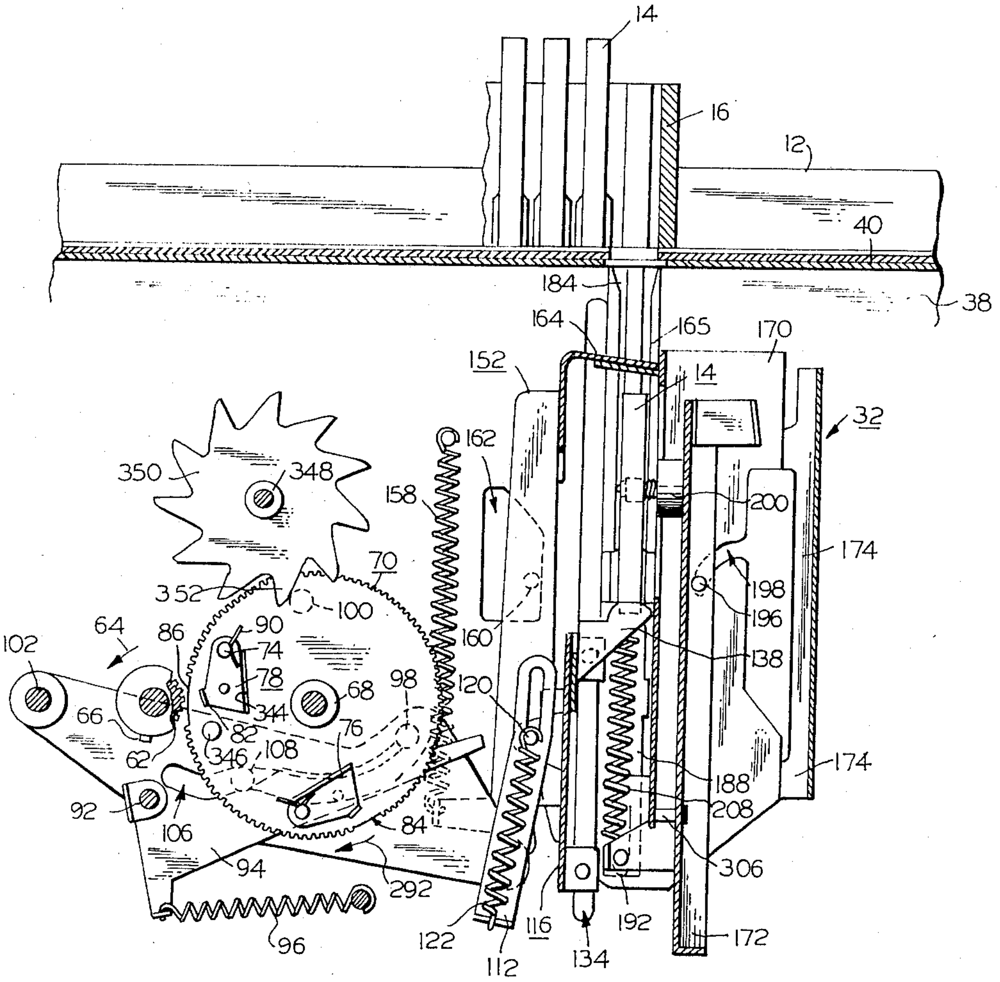
FIG. 11 is a sectional view similar to FIG. 3, but in the playing state.

When the auto-gear 70 rotates up to the position at which the second mutilated portion 86 is contiguous to the pinion 62, as shown in FIG. 11, the auto-gear 70 will not be driven by the pinion 62. Then, the auto-gear 70 positively stops at its second stop position because the regulating lever 94 is pressed against the pin 98 and the driving pin 108 on the auto-gear 70.

The cam lever 104 swings to the extremity of its clockwise rotation, and then swings back counterclockwise by a predetermined angle depending upon the shape of the slot 106 thereof, whereupon its swinging motion is stopped. Accordingly, the elevator 116 and the cartridge depressing device 152 go up and stop at the position higher by a predetermined distance than the lowest position thereof, while the cartridge 14 still occupies the lowest position thereof, as shown in FIG. 11. the lowest position thereof, as shown in FIG. 11.

When the tape stops its movement after completion of reproducing, tape end detecting means operates means for lifting the cartridge from the tape deck 32 by a predetermined distance. This mechanism will now be described.

Refering once again to FIG. 4, a solenoid 328 supported on the movable deck 172 is energized by tape end detecting means. Various embodiments may be chosen for said tape end detecting means. For example, switch means may be provided for detecting the stop of rotation of reel rollers, or switch means may be provided for detecting a silver foil strip adhered to the tape end, as is conventional.

Upon energization of the solenoid 328, a plunger or armature 330 is actuated toward the direction of arrow 332 to swing the latch member 302 in the clockwise direction through action of a connecting pin 334. As a result, the stepped portion 304 of the member 302 is unlatched from the lock pin 306 so that the movable deck 172 is lifted by the force of springs 208. Simultaneously, said movable deck 172 is rotated clockwise (FIG. 11) along the slots 198 of the main deck 170. The reel rollers 200, 202 and capstan 204 are disengaged from the cartridge 14 so as to lift it from the main deck 170 by a predetermined distance corresponding to the lifting height of the movable deck 172.

The movement of the movable deck 172 is temporarily stopped when the upper surface of the cartridge 14 is pressed against the rubber plate 165 of the cartridge depressing device 152 which was previously positioned in spaced relationship above the cartridge 14.

Referring to FIG. 10, the control pin 308 moves upwardly with the upward movement of the driven members 188. Accordingly, the switching lever 316 swings counterclockwise in response to the spring 314. At the same time, the second arm 320 of the switching lever 316 releases the actuator 324 of the microswitch 322, whereby the switch 322 changes to first open the circuit through the first motor 206 so that the tape deck operation stops, and to secondly close the circuit through the second motor 46 for driving the cartridge exchanging means. Since the third arm 326 of the switching lever 316 moves away from the clutch actuating device 282, said device 282 swings clockwise under the biasing force of the spring 286 so that the actuating pin 288 of said device 282 pushes and rotates the bent portion 344 of the second clutch lever 78 on the auto-gear 70 to the second stop position. Thus, the claw 66 of the pinion 62 which is rotating in the direction of arrow 64 in FIG. 11, kicks the bent tab 82 of the second clutch lever 78 to effect meshing engagement between the pinion 62 and the gear teeth of the auto-gear 70.

Therefore, the auto-gear 70 starts to rotate in the direction of arrow 292, and the driving pin 108 thereof drives the cam lever 104 so as to cause it to swing counterclockwise. The elevator 116 starts to move upwardly according to the rotation of the auto-gear 70, and lifts the cartridge 14 so that the cartridge 14 is restored in the tray 16. The auto-gear 70 continues to rotate still further, but the cam lever 104 does not swing in response to the driving pin 108 because of the shape of the slot 106. On the other hand, the auto-gear 70 drives means for intermittently driving the tray 16 so as to convey the next inline cartridge to the position corresponding to the insertion opening 30, as will be described presently in detail.

A pin 346 secured on the auto-gear 70 kicks one of claws 352 of a claw wheel 350 and rotates it counterclockwise by an angle corresponding to one pitch of said claw wheel 350. Said claw wheel 350 is fixedly connected with a shaft 348 journalled between the main chassis 44 and the side chassis 36. The rotation of the claw wheel 350 is transmitted to gears 356, 358 and 360 via a gear 354 which is secured on the shaft 348, as shown in FIG. 10.

Upon the rotation of the gear 360, a tray pinion 361, coaxially connected on a common shaft with said gear 360, causes a rack 362 formed at the lower surface of the tray 16 to move forwardly in the direction of arrow 364.

A detent wheel 366 can be rotated with the gear 358, and is detented by the detent roller 372 rotatably mounted at one end of a detent arm 370, which is in turn pivotally mounted on the shaft 234 and is biased in the counterclockwise direction by a spring 368. Indexing pitch of the detent wheel 366 corresponds with that of the claw wheel 350, and as should now be clear, as the detent wheel 366 rotates counterclockwise through one pitch, the tray 16 moves by one pitch and the next cartridge is thereby positioned just above the insertion opening 30 as desired. The auto-gear 70 stops temporarily at its first stop position after one cycle of rotation. Thus, one automatic reproducing cycle is completed.

On the other hand, the play button 18 in FIG. 5 is still depressed and the clutch actuating device 282 remains rotated in the clockwise direction. Accordingly, the actuating pin 288 swings the first clutch lever 76 clockwise so that the auto-gear 70 is driven by the pinion 62 again, and the next cartridge is engaged with the tape deck 32 for playing the tape, as previously set forth.

Thus, the cartridges 14 in the tray 16 are played in continuous succession. After the reproduction of the last cartridge 14 is completed, there is a vacant space above the insertion opening 30. Therefore, the cartridge exchanging means described above continues its operation but without a cartridge. This operation causes auto-stop means to restore the play button 18 and to stop the tape cartridge changer automatically in a manner hereafter described.

Referring to FIG. 10, during a normal operating state in which the cartridge exchanging means operates to engage the cartridge 14 with the tape deck 32, the control pin 308 of the driven member 188 pushes and rotates an auto-stop control device 376 in a counterclockwise direction due to its being pivotally mounted on a shaft 374 secured on the side chassis 36, said device being biased to normally rotate in the clockwise direction by action of the spring 314. Accordingly, an auto-stop actuating device 378, which is pivotally mounted on the shaft 312 and which is biased in the counterclockwise direction by the spring 286, can freely swing in association with the up and down movement of the guide pin 124 of the elevator 116.

When the elevator 116 moves upwardly after the completion of playing the cartridge 14, the auto-stop actuating device 378 rotates in the counterclockwise direction under the biasing force of the spring 286 and a bent edge 382 of a first arm 380 pushes and rotates in the same direction an auto-stop clutch arm 388; said arm 388 being pivotally mounted on a shaft 384 secured at one end of the first button releasing lever 236, which is, in turn, biased clockwise by a spring 386. In the normal situtation, means for intermittently driving the tray 16 causes the detent wheel 366 to rotate by one pitch thereof and the detent arm 370 temporarily swings clockwise. On the other hand, a bent tab 390 of the detent arm 370 never kicks a stepped portion 392 of the auto-stop clutch arm 388 because said stepped portion 392 has already escaped from said bent tab 390 by rotation. Accordingly, the first button releasing lever 236 does not rotate for operation.

Figure 12:
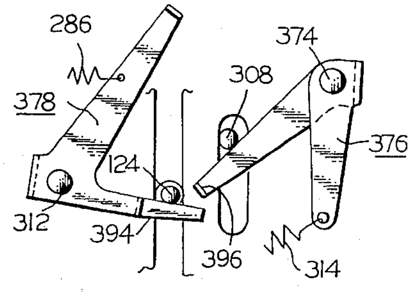

When the cartridge exchanging means next operates and the elevator 116 moves down without a cartridge, the driven members 188 are thus not depressed. Consequently, the control pin 308 does not move downwardly and the auto-stop control device 376 does not swing counterclockwise, as shown in FIG. 12. However, a second arm 394 of the auto-stop actuating device 378 is depressed by the guide pin 124 and the edge of the arm 394 is positioned below a bent edge 396 of the device 376. It should be remembered though, with reference to FIG. 10, that the control pin 308 does not go down, and never depresses the first arm 318 of the lever 316. Likewise, the clutch actuating device 282 is not kicked by the third arm 326 of the lever 316, and thus remains rotated under the force of the spring 286. As a result, the actuating pin 288 swings the second clutch lever 78 in the clockwise direction. This allows the auto-gear 70 to continue its rotation without stopping at its second stop position.

Then, it follows that the elevator 116 starts to go up immediately after it has reached the lowest position thereof, taking the guide pin 124 along.

Figure 13:
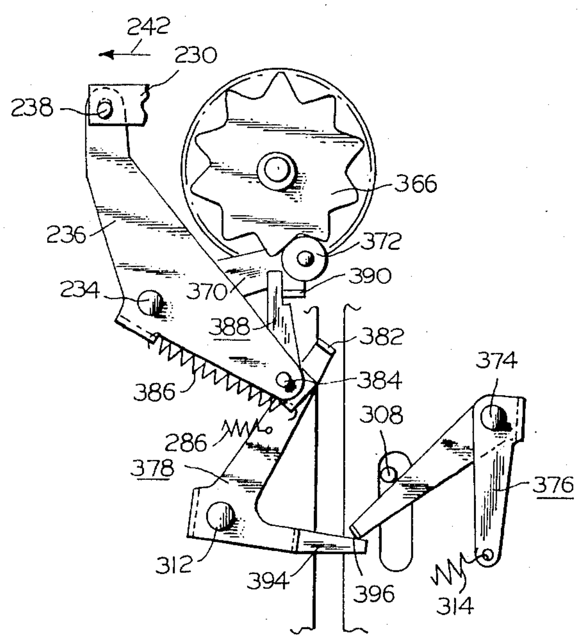
FIG. 12 and FIG. 13 are fragmentary elevational views showing the relationship of parts of the means for automatically stopping the operation of the tape cartridge changer, said parts being in the operating state.

As can be seen in FIG. 13, the auto-stop actuating device 378 now swings counterclockwise under the biasing force of the spring 286, but the swinging motion of said device 378 is stopped on the way as a result of the second arm 394 being intercepted by the bent edge 396 of the device 376. The bent edge 382 of the device 378 does not push the auto-stop clutch arm 388 out of the way of the bent tab 390 of the detent arm 370.

When the detent arm 370 temporarily swings clockwise at the start of the rotational cycle of the auto-gear 70, the bent tab 390 of the arm 370 pushes the stepped portion 392 of the arm 388 so as to swing the first button releasing lever 236 clockwise about the shaft 234. Consequently, the first latch plate 230 is pushed in the opposite direction of arrow 242.

Referring now to FIG. 6, according to the movement of the first latch plate 230 in the opposite direction of arrow 242, the bent tab 258 of the play key 214 is unlatched from the cut-out portion 260 of the plate 230. Then, the play button 18 is restored upwardly to its original position under the force of a spring 398, as shown in FIG. 5.

Upon restoration of the play key 214, the L shaped lever 270 swings in the counterclockwise direction (FIG. 5) to push the connecting rod 274 in the opposite direction of arrow 290 so that the clutch actuating device 282 swings counterclockwise. Accordingly, the actuating pin 288 never pushes the first clutch lever 76, and the auto-gear 70 maintains its first stop position.

Upon such resotration of the play key 214 to the inoperative position, the projection 262 pushes the microswitch 264 to open the electrical circuit (FIG. 9) so that the motor 46 is no longer supplied with electric power.

There will be hereinafter described the operation of this tape cartridge changer when the other buttons are depressed.

Thus, with reference to FIG. 5, the reject button 20 is not latched when it is depressed, and is restored upwardly by a spring 400 when an operator removes his finger from the button 20.

When the reject button 20 is depressed during tape playing of the cartridge which is engaged with the tape deck, a leaf switch 401 attached on the supporting plate 226 is operated by a bent tab 403 of the reject key 216 so as to energize the solenoid 328 (see FIG. 4). Consequently, as previously described, the cartridge 14 is lifted from the tape deck 32 by a predetermined distance, and the cartridge exchanging means is initiated to exchange the cartridges.

When the fast forward button 24 (see FIG. 5) is depressed during tape playing of the cartridge 14, the second latch plate 232 is moved in the direction of arrow 252, in FIG. 7, by the spring 250; it being remembered that said spring 250 is fastened to the second button releasing lever 246, and consequently the bent tab 254 of the fast-forward key 220 is latched by a cut-out portion 402 of the plate 232.

On the other hand, in association with the depressing movement of the fast-forward key 220, suitable fast-forward means (not shown), brings the tape deck 32 into the fast-forward state so that the tape in the cartridge 14 is wound rapidly onto the takeup reel 13 from the supply reel 11 (see FIG. 15). The reel rollers, 200 and 203, stop rotation when the tape is fully wound on the takeup reel 13 and the tape end detecting means energize the solenoid 328 (FIG. 4) thereby initiating the cartridge exchanging means.

When the elevator 116 goes up to the highest position thereof, as shown in FIG. 5, the guide pin 124 pushes and rotates the second button releasing lever 246 so as to drive the second latch plate 232 through the pin 248 in the opposite direction of arrow 252 in FIG. 7. The bent tab 254 of the key 220 is thus unlatched from the cut-out portion 402 of the plate 232 so that the fast-forward button 24 is restored upwardly by a spring 404. The play button 18, however, still occupies the original depressed position it occupied when the button 24 was depressed. This allows the next cartridge 14 to go down and to engage with the tape deck 32 for playback.

When the rewind button 26 is depressed during tape playing of the cartridge, the bent tab 256 of the rewind key 222 in FIG. 7 is latched by a cut-out portion 406 of the plate 232. Then, the tape deck 32 is changed into the rewind state by suitable rewind means (not shown) which is associated with the rewind key 222. When the tape is fully rewound on the supply reel 11 from the takeup reel 13, the reel rollers 200, 203 stop rotation, and the operation of the cartridge exchanging means is initiated to exchange the cartridge 14 for the next in-line cartridge, as was previously explained during the discussion of the operation of the fast-forward mode. The rewind button 26 is also restored to the upward position by a spring 407 when the elevator 116 returns upwardly.

When the stop button 22 in FIG. 5 is depressed during playing of the cartridge 14, a projection 408 of the stop key 218 pushes a bent portion 410 of the fast-forward key 220 to assure depression of the fast-forward button 24 at the same time. The stop key 218 is latched in a fashion such that a bent tab 412 thereof engages with a cut-out portion 414 of the first latch plate 230 (FIG. 6).

The fast-forward button 24 is also depressed and the tape deck 32 is changed into the fast-forward state so that the tape in the cartridge is rapidly wound on the takeup reel 13 from the supply reel 11.

When the tape is fully wound on the takeup reel 13, the cartridge exchanging means is intitiated as previously set forth, and the elevator 116 moves upwardly.

Figure 14:
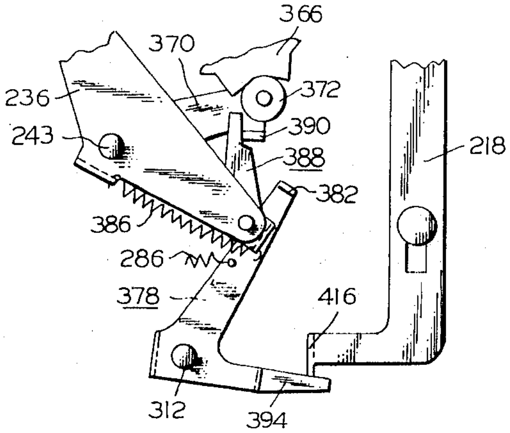
FIG. 14 is a fragmentary elevational view showing the relationship of parts of the means for automatically stopping the operation of the tape cartridge changer when said means is operated manually.

In addition to the above, a lower bent portion 416 of the stop key 218 pushes and swings the second arm 394 of the auto-stop actuating device 378 in the clockwise direction, as shown in FIG. 14, so as to cause the bent edge 382 of the device 378 to assume the inoperative position with respect to the autostop clutch arm 388.

Accordingly, the play button 18 is restored upwardly when means for intermittently driving the tray 16 is operated, and the tape cartridge changer is changed into the stop state as previously described. At this time, the stop button 22 and the fast-forward button 24 in FIG. 5 are restored upwardly by a spring 418 and the spring 404, respectively, because the first latch plate 230 and the second latch plate 232 move in the direction opposite to the arrows 242 and 252 in FIG. 6 and FIG. 7, as previously set forth.

When the record button 28 in FIG. 5 is depressed, a suitable electrical circuit (not shown) is switched from a play ing state to a recording state In a state where the play key 214 is not depressed as shown in FIG. 6, an operator can depress the record key 224 alone for the purpose of regulating the recording level, for example. But the record key 224 can not be latched by the first latch plate 230 at its depressed position, and the key 224 is restored upwardly by a spring 419 when the operator removes his finger from the record button 28.

After depression of the play key 214 has caused the first latch plate 230 to move in the direction of arrow 242, the record button 28 can not be depressed because a bent tab 420 of the record key 224 has been inserted into a cut-out portion 422 of the first latch plate 230. This prevents pre-recorded tape from being erased by wrong depression of the record button 28 during tape playing of the cartridges.

Thus, the operator must depress the play button 18 and the record button 28 at the time if he wants to record on the tape in the cartridges. In this situation, the bent tab 258 of th play key 214 and the bent tab 420 of the record key 224 are latched by the respective cut-out portions 260 and 424 of the first latch plate 230 at their depressed position, and the cartridges are successively recorded.

After completion of recording of all cartridges in the tray 16, the tape cartridge changer automatically stops its operation, as will be apparent in the description previously set forth.

Another advantage of this apparatus is that the tray 16 can be manually moved if desired when the apparatus is in the stop state. Click motion is given to the detent wheel 366 through gears 358, 360, 361 with which the rack 362 of the tray 16 meshes as previously stated. Accordingly, the operator can move the tray manually to bring the desired cartridge to the exact position corresponding to the insertion opening 30.

It is apparent that various modifications may be made without departing from the substantial properties in the invention. The above described specific example is intended merely to illustrate the various inventive facets in a single selective embodiment of the invention, the scope of which it is intended shall be limited only by the follow claims.

What is claimed is:

1. A combination tape deck and tape cartridge changer comprising: a chassis, a tray for receiving a plurality of cartridges, each having a magnetic tape therein, said tray being movably mounted on the upper side of said chassis; a tape deck which includes tape moving means for moving said tape at a predetermined speed, and at least one magnetic head for recording and/or playback of said tape, tape deck mounting means on the lower side of said chassis in which said tape deck is mounted for movement into and out of engagement with a tape cartridge when the cartridge is in an operative position, said chasses having an insertion opening therein between said tray and said tape deck through which each of said cartridges can pass between said tray and said tape deck; guide means on said chassis on said insertion opening for guiding said cartridges up and down between said tray and said tape deck through said insertion opening; tray driving means engaged with said tray for driving said tray intermittently to convey said cartridges successively to a loading position corresponding to said insertion opening; and cartridge exchanging means operatively associated with said tape deck and guide means including an elevator which is movable between a raised position and a lowest position and which successively translates said cartridges from said loading position to a predetermined inoperative position in face to face relationship with said tape deck and which returns each of said cartridges from said inoperative position to said loading position under guidance of said guide means, cartridge shifting means for shifting said cartridges from said inoperative position to an operative position, and projecting means on said tape deck projecting into the path of movement of said cartridges from the inoperative to the operative position and engaged by said cartridges for moving said tape deck toward the operative position of said tape cartridge for engaging said tape moving means of said tape deck with the tape cartridges and the magnetic head with the magnetic tape in the cartridges.

2. The combination tape deck and tape cartridge changer as claimed in claim 1 in which said tape deck further includes a movable deck which has said tape moving means thereon, and said cartridge shifting means moves each of said cartridges in a descending movement from said inoperative position in face to face spaced relationship with said tape deck to said operative position and further engages said projecting means on said tape deck, said tape deck mounting means includes guide for guiding said tape deck downwardly and toward said elevator, whereby the engagement of said cartridges with said projecting means gives to said movable tape deck a descending motion and a motion toward said cartridge during descending movement thereof so that said cartridge is engaged with said tape moving means on said movable deck.

3. The combination tape deck and tape cartridge changer as claimed in claim 2, further comprising: a first motor mounted on said movable deck and driving said tape moving means, and a second motor coupled to said tray driving means and said cartridge exchanging means for driving said tray driving means and said cartridge exchanging means.

4. The combination tape deck and tape cartridge changer as claimed in claim 1, in which said cartridge exchanging means further comprising spring means engaged by said cartridge in said operative position for urging each of said cartridges to move from said operative position to said inoperative position in response to detection of the end of the tape in the cartridge and to start said elevator moving from its lowest position to its raised position to return said cartridge to said tray; and clutch means coupled to said cartridge exchanging means for initiating operation thereof in response to said movement of said cartridge from said operative position to said inoperative position.

5. The combination tape deck and tape cartridge changer as claimed in claim 4 in which said cartridge exchanging means further includes an auto-gear for driving said elevator and said cartridge shifting means, a driving pinion capable of meshing with said auto-gear, and a motor coupled to said driving pinion for rotating said driving pinion, said clutch means cooperating with said auto-gear and pinion for bringing said auto-gear into meshing engagement with said pinion.

6. The combination tape deck and tape cartridge changer as claimed in claim 1 in which said tape moving means of the tape deck is a first motor, and said cartridge exchanging means includes a second motor for supplying a rotational force thereto, and switch means coupled to said motors and actuable for selectively energizing said first motor and said second motor in response to the movement of said cartridge from said operating position to said inoperative position.

7. The combination tape deck and tape cartridge changer as claimed in claim 1 further comprising: reject means engageable with said cartridge when it is in said operative position for manually moving the cartridge engaged with said tape deck from said operative position to said inoperative position so as to actuate said clutch means to initiate operation of said cartridge exchanging means.

8. The combination tape deck and tape cartridge changer as claimed in claim 1 in which said tray driving means includes a claw wheel coupled to and intermittently driven by said auto-gear, and a tray pinion which is coupled to said claw wheel of said tray having a rack thereon with which said tray pinion is engaged, whereby said auto-gear drives said claw wheel to move said tray so as to convey said cartridges a distance equal to the pitch of adjacent cartridges in said tray with every full rotation of said autogear.

9. The combination tape deck and tape cartridge changer as claimed in claim 8 in which said tray driving means further includes a detent wheel coupled to and driven with said tray pinion for imparting a click motion to said tray pinion at a rotational angle corresponding to a distance between the adjacent cartridges in said tray.

10. The combination tape deck and tape cartridge changer as claimed in claim 1, further comprising: first clutch means coupled to said cartridge exchanging means and responsive to termination of the ascending movement of said elevator for initiating operation of said cartridge exchanging means so as to cause said elevator to descend from its raised position when said elevator returns said cartridges to said loading position in said tray, and to stop said cartridge exchanging means when said elevator undergoes descending and ascending movement without the cartridge, and second clutch means coupled to said cartridge exchanging means and responsive to termination of tape movement of the cartridge, and also responsive to termination of descending movement of said elevator when said elevator descends without the cartridge, said second clutch means being for initiating operation of said cartridge exchanging means so as to raise said elevator from its lowest position, whereby said cartridge exchanging means stops its cartridge exchanging operation after said elevator has undergone said descending and ascending motion without the cartridge.

11. The combination tape deck and tape cartridge changer as claimed in claim 1, further comprising: button means coupled to said first clutch means for manually actuating said first clutch means to initiate operation of said cartridge exchanging means so as to cause said elevator to descend from its raised position, said first button means including means for restoring said first button means to its inoperative position upon termination of the ascending movement of said elevator when said elevator undergoes descending and ascending movement without the cartridge.

12. The combination tape deck and tape cartridge changer as claimed in claim 10, further comprising: a play button coupled to said first clutch means for manually actuating said first clutch means to initiate operation of said cartridge exchanging means so as to cause said elevator to descend from its raised position, a stop button coupled to said second clutch means for manually actuating said second clutch means to initiate operation of said cartridge exchanging means so as to cause said elevator to ascend from its lowest position, and a button releasing lever coacting with said stop button and said play button to restore said play button to its inoperative position upon termination of the ascending movement of said elevator.

13. The combination tape deck and tape cartridge changer as claimed in claim 1, in which said tape deck further includes fast-forward means coupled to said tape moving means for fast-forward drive of the tape, and rewind means coupled to said tape moving means for rewinding the tape, said fast-forward means and said rewind means including a fast-forward button and rewind button respectively for manually operating said fast forward means and said rewind means, and further including locking means for locking said buttons in their operative positions, and restoring means coupled between said buttons and said cartridge exchanging means for restoring said buttons to their inoperative positions in response to the actuation of said cartridge exchanging means at each cycle thereof.

14. The combination tape deck and tape cartridge changer as claimed in claim 13 further comprising means coupling said fast-forward button and said stop button for moving said fast-forward button to its operative position upon manual operation of said stop button for initiating operation of said cartridge exchanging means so as to cause said elevator to ascend from its lowest position after the tape in the cartridge has been fully wound on a take-up reel by said fast-forward means.

15. A combination tape deck and tape cartridge changer comprising: a chassis; a tray for receiving a plurality of cartridges, each having a magnetic tape therein, said tray being movably mounted on the upper side of said chassis and having a rack thereon; a tape deck which includes tape moving means for moving said tape at a predetermined speed, a first motor coupled to said tape moving means for driving said tape moving means, and at least one magnetic head for recording and/or playback of said tape, tape deck mounting means on the lower side of said chassis in which said tape deck is mounted for movement into and out of engagement with a tape cartridge when the cartridge is in an operative position, said chassis having an insertion opening therein between said tray and said tape deck through which each of said cartridges can pass between said tray and said tape deck; guide means on said chassis at said insertion opening for guiding said cartridges up and down between said tray and said tape deck through said insertion opening; tray driving means including a pinion meshed with said rack on the tray for intermittently driving said tray to convey said cartridges successively to a loading position corresponding to said insertion opening; and cartridge exchanging means operatively associated with said tape deck and guide means and including an elevator which is movable between a raised position and a lowest position and which successively transports each of said cartridges from said loading position to a predetermined inoperative position in face to face relationship with said tape deck and which returns each of said cartridges from said inoperative position to said loading position under guidance of said guide means, cartridge shifting means for shifting said cartridges from said inoperative position to an operative position, and projecting means on said tape deck projecting into the path of movement of said cartridges from the inoperative to the operative position and engaged by said cartridges for moving said tape deck toward the operative position of said tape cartridge for engaging said tape moving means of said tape deck with the tape cartridges and the magnetic head with the magnetic tape in the cartridges; and a second motor coupled to said tray driving means, said elevator and said cartridge shifting means for driving them.

16. The combination tape deck and tape cartridge changer as claimed in claim 15 in which said tape deck includes a stationary main deck having said magnetic head mounted thereon and having said guide means fixed thereon, and a movable deck provided with said tape moving means and said first motor and said projecting means, said tape deck mounting means mounting said movable deck for moving said movable deck towards said main deck so as to engage with said cartridges when said cartridges are brought to said operative position by said cartridge shifting means, said cartridges engaging said projecting means on said movable deck to cause said movement thereof.

17. The combination tape deck and tape cartridge changer as claimed in claim 15 further comprising: detent means with which said pinion is connected, said detent means imparting a click motion to said pinion so as to regulate said tray for positioning each of said cartridges in the tray at the loading position corresponding to said insertion opening.

* * * * *